(12) United States Patent
Riley, II et al.

(10) Patent No.: US 6,640,531 B1
(45) Date of Patent: Nov. 4, 2003

(54) RAKE

(75) Inventors: Richard Riley, II, 3404 156th St., Des Moines, IA (US) 50323; Daryl A. Michael, Newton, IA (US)

(73) Assignee: Richard Riley, II, Des Moines, IA (US)

(*) Notice: Subject to any disclaimer, the term of this patent is extended or adjusted under 35 U.S.C. 154(b) by 0 days.

(21) Appl. No.: 10/241,878

(22) Filed: Sep. 12, 2002

(51) Int. Cl.$^7$ .................................................. A01D 7/00
(52) U.S. Cl. ................................... 56/400.01; 56/400.21
(58) Field of Search ........................ 56/400.01, 400.21, 56/400.17, 220, 222, 226, DIG. 20; D8/13; 403/326, 329, 321, 322.1, 315–317

(56) References Cited

U.S. PATENT DOCUMENTS

| | | | | |
|---|---|---|---|---|
| 1,978,717 A | * | 10/1934 | Oppenheim | 56/400 |
| 2,302,541 A | * | 11/1942 | Fuller | 56/400.17 |
| 2,423,772 A | * | 7/1947 | Haase | 56/400.17 |
| 2,432,653 A | * | 12/1947 | Bloom | 56/400 |
| 2,850,865 A | * | 9/1958 | Anderson | 56/400.17 |
| 3,045,414 A | * | 7/1962 | Scheidenhelm | 56/221 |
| 3,148,494 A | * | 9/1964 | Scheidenhelm | 56/400 |
| 3,171,243 A | * | 3/1965 | Johnston | 56/400 |
| 3,175,347 A | * | 3/1965 | Scheidenhelm | 56/400 |
| 3,360,912 A | * | 1/1968 | Erdman et al. | 56/220 |
| 4,067,177 A | * | 1/1978 | Tout | 56/226 |
| 4,270,614 A | * | 6/1981 | Judy | 171/63 |
| 4,630,432 A | * | 12/1986 | Love et al. | 56/220 |

FOREIGN PATENT DOCUMENTS

JP  2-312513  * 2/1990

OTHER PUBLICATIONS

COPY—1 sheet of drawing (Fig. 8) from application—showing a rake—available at Earl May Garden Centers in Des Moines, Iowa.

* cited by examiner

*Primary Examiner*—Thomas B. Will
*Assistant Examiner*—Alicia Torres
(74) *Attorney, Agent, or Firm*—Sturm & Fix LLP

(57) ABSTRACT

A rake having a plurality of rake assemblies, each having a loop portion on the rear end thereof and a tooth portion on the front thereof. The loop portion has a predetermined thickness corresponding to openings in a rake head. A projection on the rear side of each one of the openings in the rake head is provided so that the loop portion of the rake tooth assembly can pass through an opening and over the projection. This arrangement, in conjunction with the portion of each rake tooth assembly abutting the front side of the rake head, holds the rake tooth assembly in place. A method of attaching a rake tooth assembly to the rake head and also a method of detaching a rake tooth assembly from a rake head for replacement purposes.

4 Claims, 3 Drawing Sheets

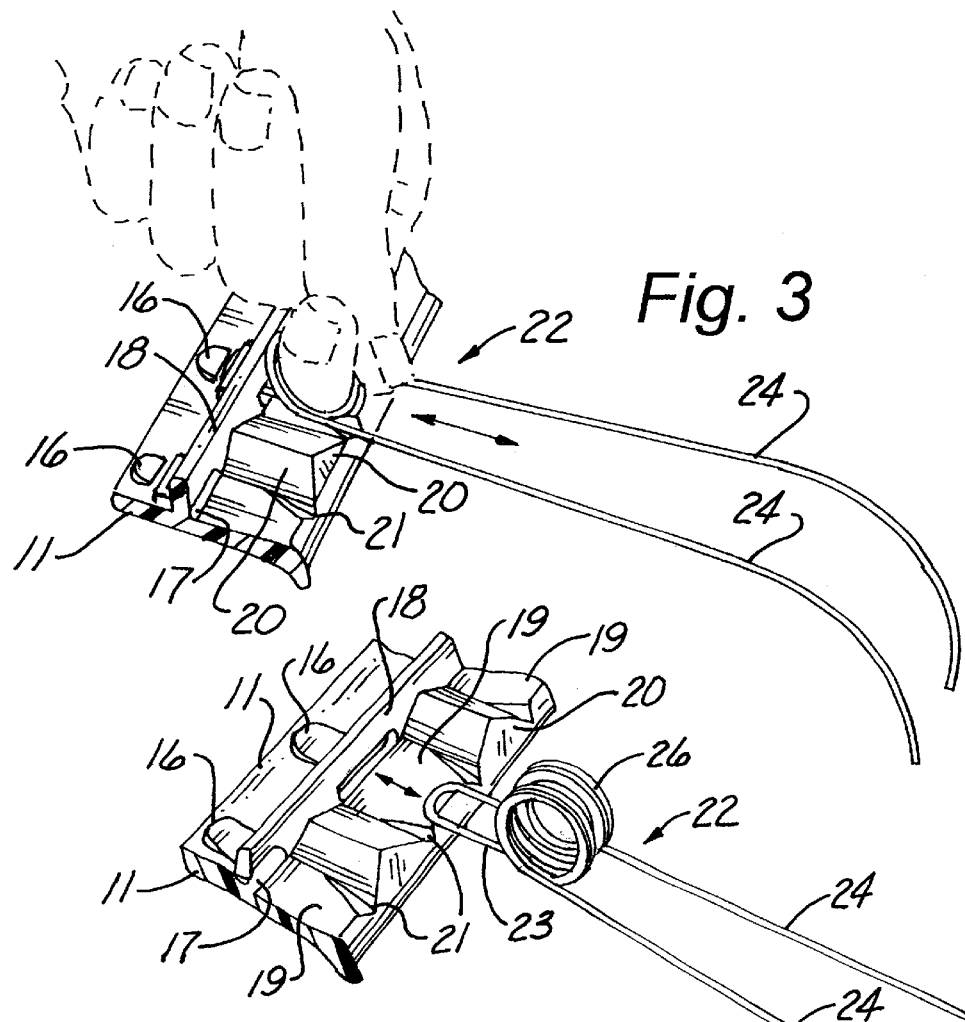
Fig. 3
Fig. 4
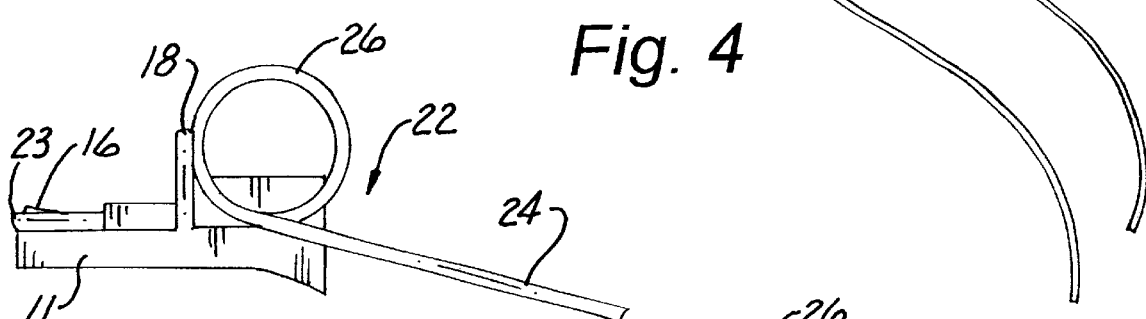
Fig. 5
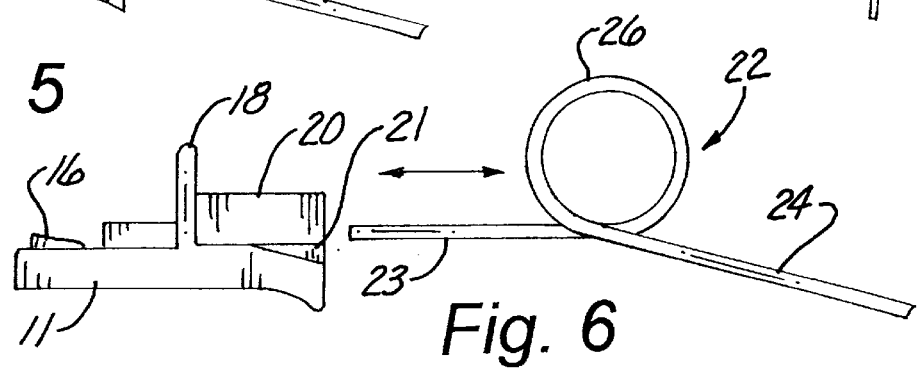
Fig. 6

RAKE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

This invention relates generally to rakes and more particularly to a rake which has very few parts and which can be easily assembled or disassembled.

2. Description of the Related Art

A rake which has had considerable commercial success is shown in FIG. 8 of this patent. While the entire rake is not shown, it is noted that this prior art rake includes forty-five pieces. There is a rake head, a rake handle, fourteen tines, fourteen bolts, and fourteen threaded nuts, in addition to the rake head, handle and the fastener to connect the handle to the rake head. Because of the large number of parts, the prior art rake of FIG. 8 is expensive to produce, primarily because of the labor involved for assembly.

Accordingly, there is a need for a rake which can be just as reliable but which can be made more cheaply.

BRIEF SUMMARY OF THE INVENTION

The present invention relates to a rake having a plurality of rake assemblies, each having a loop portion on the rear end thereof and a tooth portion on the front thereof. The loop portion has a predetermined thickness corresponding to openings in a rake head. A projection on the rear side of each one of the openings in the rake head is provided so that the loop portion of the rake tooth assembly can pass through an opening and over the projection. This arrangement, in conjunction with the portion of each rake tooth assembly abutting the front side of the rake head, holds the rake tooth assembly in place. The present invention also includes a method of attaching a rake tooth assembly to the rake head and also includes a method of detaching a rake tooth assembly from a rake head for replacement purposes.

An object of the present invention is to provide an improved rake.

Another object of the present invention is to provide a new rake which is cheaper to construct because of savings in labor costs, but which is just as reliable as prior art rakes.

Other objects, advantages, and novel features of the present invention will become apparent from the following detailed description of the invention when considered in conjunction with the accompanying drawings.

BRIEF DESCRIPTION OF THE DRAWINGS

FIG. 3 is a perspective view showing how to attach a new rake tooth assembly to the rake head;

FIG. 4 is a view showing a rake tine in position to be attached to the rake to the position shown in FIG. 3, or removed therefrom;

FIG. 5 is a side elevational view of one side of the rake head and showing how a tooth assembly is attached to the rake head;

FIG. 6 is a side elevational view like FIG. 4;

DETAILED DESCRIPTION OF THE INVENTION

Figure 1:
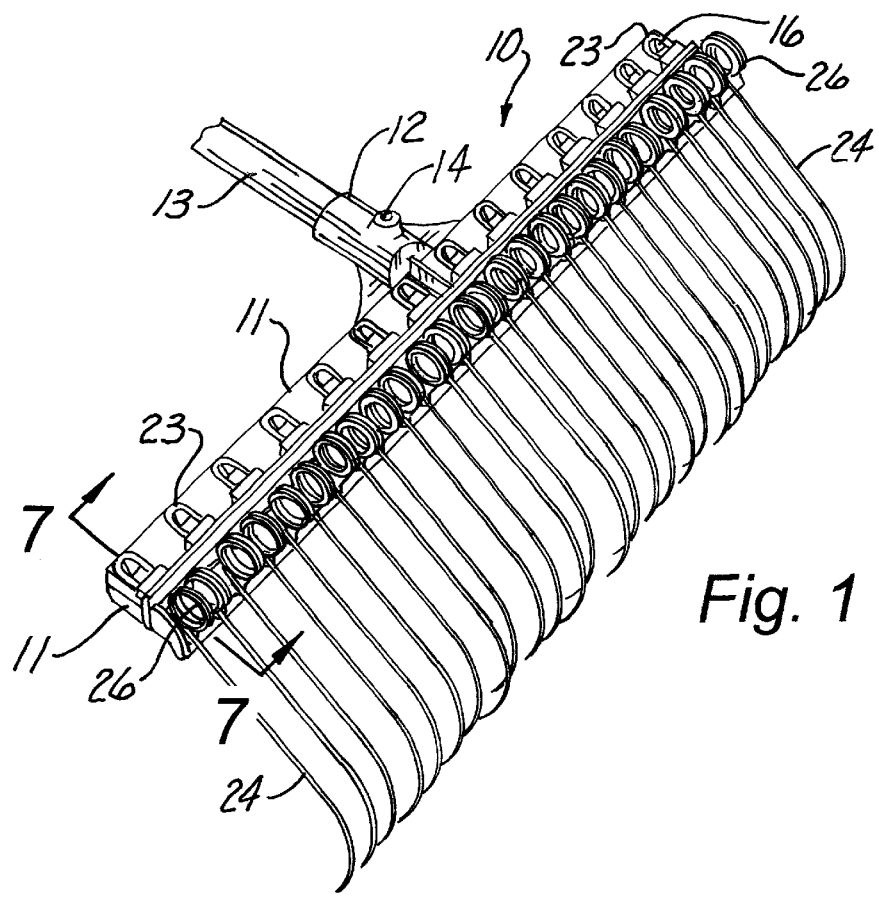
FIG. 1 is a perspective view of a rake constructed in accordance with the present invention.

Referring now to the drawings wherein like reference numerals designate identical or corresponding parts throughout the several views, FIG. 1 shows a rake (10) constructed in accordance with the present invention.

The rake (10) includes a rake head (11) with an attachment portion (12) for receiving a handle (13) for the rake (10). Opening (14) is provided for permitting a fastener, such as a rivet, nail, screw or the like, to hold the handle (13) solidly in the opening in portion (12) of the rake head.

Referring to FIG. 4, it is noted that the rake head (11) has projections (16) thereon on the backside of the rake head (11), just behind an opening (17) in an upstanding wall (18) in the rake head (11). In front of each opening (17) is a supporting surface (19) having V-shaped depressions (21) therein and raised portions (20) on each side of the support surfaces (19).

A rake tooth assembly (22) has a rear loop portion (23), a tooth portion (24) and helical spring portions (26) for permitting more flexing of the teeth (24) with respect to the rake head (11).

Referring to FIG. 4, it is noted that in order to attach one of the rake tooth assemblies (22) to the rake head (11), the rake tooth assembly (22) is pushed rearwardly through one of the slots (17) so that the loop portion (23) extends over one of the projections (16). The projection (16) is tapered somewhat so that as the loop (24) passes over it, it will bend upwardly slightly and then snap over the top thereof as is shown, for example, in FIGS. 2 and 7. This moving of the rake tooth assembly (22) is shown in sequence from FIG. 4 to FIG. 3.

Figure 2:
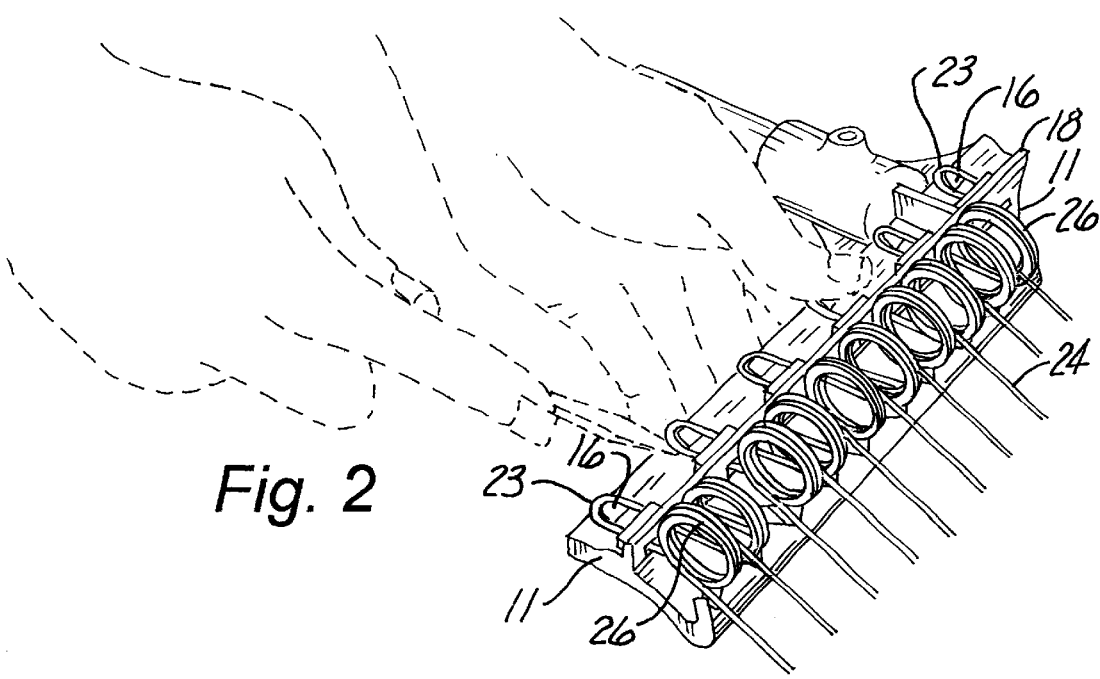
FIG. 2 is a view showing how one of the rake tooth assemblies can be removed for replacement.
Figure 7:
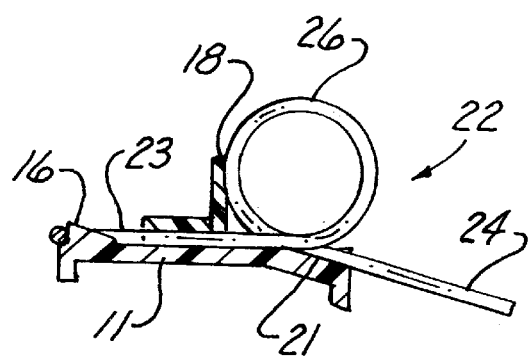
FIG. 7 is a cross sectional view taken along line 7—7 of FIG. 1 and showing how the rake tine is held in place by a loop thereon disposed through an opening and around a projection.
Figure 8:
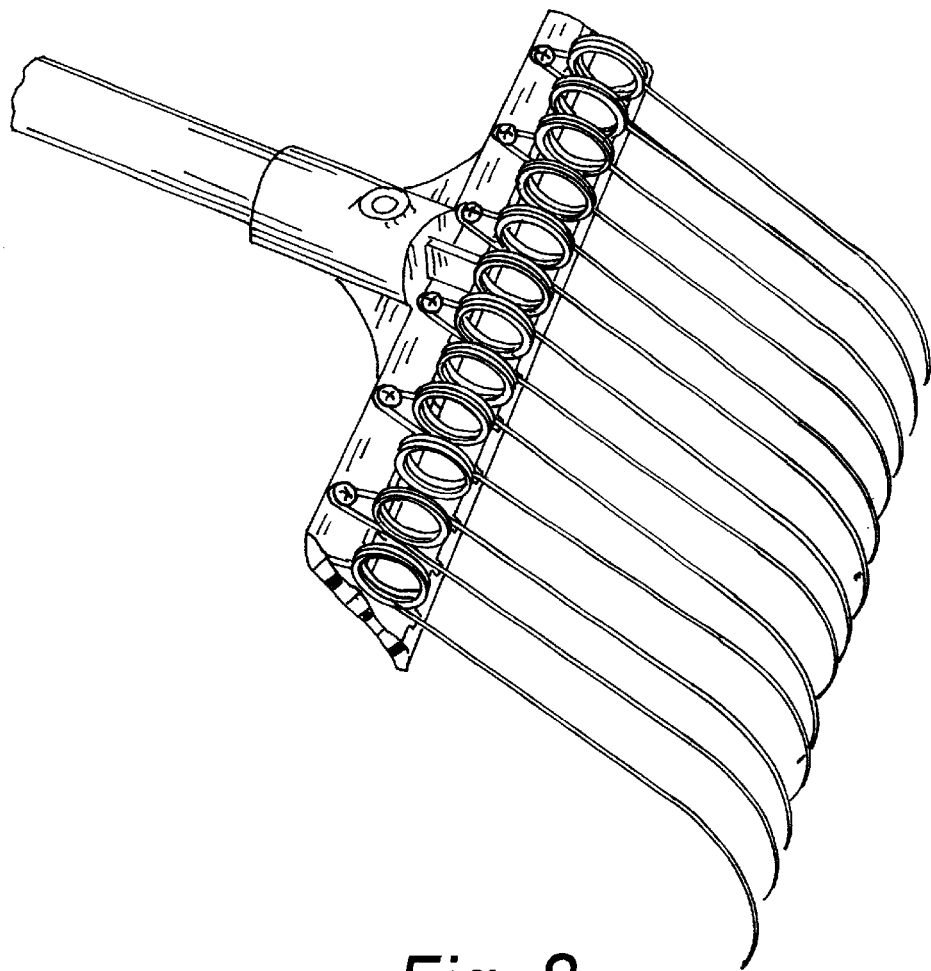
FIG. 8 is a view of a prior art rake.

Once in the position shown in FIGS. 2, 5 and 7, the rake tooth assembly (22) is held in place because, not only is the loop (23) over and around projection (17), but because the helical spring portion (26) abuts the wall (18). Spring portion (26) creates a force, pulling the loop (23) towards the projection (16) thereby keeping the rake tooth assembly (22) in the position shown in FIGS. 2, 5 and 7. Consequently, it is important to have the spacing of the helical portions (26) such that they will abut the head portion (18) just prior to the time that the loop (23) goes over the projection (17) so that additional pushing on the tine assembly (22) will cause the loop portion (23) to snap over projection (17) and the spring force of the helical projections (26) will hold the rake tooth assembly (22) firmly in place.

The rake tooth assemblies (22) are also held between projections (20) and on supporting surface (19) so that the tines (24) fit in the slots (21) and are held in place from downward flexing but they can flex upwardly. After they flex, they snap back into the slots (21).

It is to be understood that the rake tooth assembly (22) could have something besides the helical spring members

(26) which abut the rake head (11) to keep the loop portion (23) over the projections (16). For example, it could be something that extends downwardly and hits an extreme front of the rake head (11) rather than the upstanding wall (18). Also, it is to be understood that while in the present embodiment shown, the spring of loop (23) will bend upwardly over the projection (16) before it snaps downwardly over the top thereof, it could be done in a different fashion where the projection (16) is resilient instead of or in combination with the loop (23).

Once all of the parts are fully assembled as is shown in FIG. 1, the rake can be used like other rakes to manually rake leaves in a yard or the like; but, of course, the head (11) could be moved by a mechanical device instead of using it only as a manual rake.

Obviously many modifications and variations of the present invention are possible in light of the above teachings. It is therefore to be understood that, within the scope of the appended claims, the invention may be practiced otherwise than as specifically described.

We claim:

1. A rake apparatus comprising:

a plurality of rake tooth assemblies, each of said rake tooth assemblies having a loop portion on a rear portion thereof, and a tooth portion on a front portion thereof; said loop portion having a predetermined thickness;

a rake head with a front end and a rear end, said head having a plurality of openings disposed therein, said openings having an effective height substantially the same as the thickness of said loop portion of the rake tooth assembly;

a projection on the rake head on a rear side of each one of the openings, said loop portion of each of the rake tooth assemblies extending through an opening and around the projection, and wherein said projection is higher in the rear thereof than at the front thereof, whereby when the loop is pushed through the opening and over the projection at least one of the loop portion and projection will deform enough to allow the loop portion to pass over the projection and then be trapped behind the projection; and a portion of each of said rake tooth assemblies disposed on a front side of each opening being in operative contact with said rake head to keep the loop in contact with the projection while the loop portion is disposed in an operative position within one of the openings.

2. The rake apparatus of claim 1 including a handle operatively attached to said rake head.

3. A method of assembling a rake apparatus of a type comprising:

a plurality of rake tooth assemblies, each of said rake tooth assemblies having a loop portion on a rear portion thereof, and a tooth portion on a front portion thereof; said loop portion having a predetermined thickness; a rake head with a front end and a rear end, said head having a plurality of openings disposed therein, said openings having an effective height substantially the same as the thickness of said loop portion of the rake tooth assembly; a projection on the rake head on a rear side of each one of the openings, said loop portion of each of the rake tooth assemblies extending through an opening and around the projection and a portion of each of said rake tooth assemblies disposed on a front side of each opening being in operative contact with said rake head to keep the loop in contact with the projection while the loop portion is disposed in an operative position within one of the openings, said method comprising:

attaching a rake tooth assembly by forcing the loop portion thereof from the front to the rear of one of the openings in the rake head until the loop passes over the projection on the rear side of the opening and said portion of the rake tooth assembly operatively abuts the rake head whereby the rake tooth assembly will be held to the rake head; and removing the rake tooth assembly from the rake head by prying the loop up and onto the top of the projection and then pulling the rake tooth assembly out of the front of the opening in the rake head, whereby the rake tooth assembly can easily be replaced.

4. The method of claim 3 including attaching a handle to the rake head.

* * * * *